United States Patent
Höfener et al.

(10) Patent No.: US 10,481,413 B2
(45) Date of Patent: Nov. 19, 2019

(54) OPTICAL ARTICLE COMPRISING AN ANTIREFLECTIVE COATING IN THE VISIBLE REGION FOR LOW LUMINANCE CONDITIONS

(71) Applicant: RUPP + HUBRACH OPTIK GMBH, Bamberg (DE)

(72) Inventors: Conrad Höfener, Bamberg (DE); Thorsten Stein, Stegaurach (DE)

(73) Assignee: RUPP + HUBRACH OPTIK GMBH, Bamberg (DE)

(*) Notice: Subject to any disclaimer, the term of this patent is extended or adjusted under 35 U.S.C. 154(b) by 0 days.

(21) Appl. No.: 15/557,665

(22) PCT Filed: Mar. 13, 2015

(86) PCT No.: PCT/EP2015/055356
§ 371 (c)(1),
(2) Date: Sep. 12, 2017

(87) PCT Pub. No.: WO2016/146153
PCT Pub. Date: Sep. 22, 2016

(65) Prior Publication Data
US 2018/0067338 A1    Mar. 8, 2018

(51) Int. Cl.
*G02C 7/10*     (2006.01)
*G02B 1/116*    (2015.01)
(Continued)

(52) U.S. Cl.
CPC ............ *G02C 7/10* (2013.01); *G02B 1/11* (2013.01); *G02B 1/113* (2013.01); *G02B 1/115* (2013.01); *G02B 1/116* (2013.01); *G02C 7/104* (2013.01)

(58) Field of Classification Search
CPC .. G02C 7/10; G02C 7/104; G02B 1/11; G02B 1/113; G02B 1/115; G02B 1/116; G02B 1/118
(Continued)

(56) References Cited

U.S. PATENT DOCUMENTS

| | | | |
|---|---|---|---|
| 2009/0169859 A1* | 7/2009 | Biteau | G02B 3/0087 428/304.4 |
| 2012/0057236 A1* | 3/2012 | Broadway | C03C 17/3435 359/586 |

(Continued)

FOREIGN PATENT DOCUMENTS

| | | |
|---|---|---|
| WO | WO2008/059177 | 11/2007 |
| WO | WO2007/147509 | 12/2007 |
| WO | WO2015/000534 | 1/2015 |

OTHER PUBLICATIONS

Schubert, "Light Emitting Diodes, Chapter 16: Human Eye Sensitivity and Photometric Quantities", (2006), pp. 275-291.

*Primary Examiner* — Darryl J Collins
(74) *Attorney, Agent, or Firm* — Norton Rose Fulbright US LLP

(57) ABSTRACT

This invention relates to an ophthalmic lens comprising a transparent substrate with a front main face and with a rear main face, at least one of the main faces being coated with a multilayered antireflective coating comprising a stack of at least one high refractive index layer (HI) having a refractive index higher than or equal to 1.55 and at least one low refractive index layer (LI) having a refractive index lower than 1.55, characterized in that said multilayered antireflective coating has: a mean light reflection factor in the visible region for photopic vision Rv lower than or equal to 2.5%, preferably lower than or equal to 0.9%, for at least an angle of incidence lower than 35°; a mean light reflection factor in the visible region for scotopic vision Rv' lower than or equal (Continued)

to 0.5%, preferably lower than or equal to 0.4%, for at least an angle of incidence lower than 35°.

20 Claims, 1 Drawing Sheet

(51) Int. Cl.
 *G02B 1/11* (2015.01)
 *G02B 1/115* (2015.01)
 *G02B 1/113* (2015.01)
(58) Field of Classification Search
 USPC ...... 351/44, 159.49, 159.59, 159.62, 159.65; 359/601
 See application file for complete search history.

(56) References Cited

U.S. PATENT DOCUMENTS

| | | |
|---|---|---|
| 2014/0368788 A1 | 12/2014 | Cado et al. |
| 2016/0154254 A1* | 6/2016 | Bolshakov ............... G02B 1/11 351/159.66 |
| 2017/0075040 A1* | 3/2017 | Bolshakov ............. G02B 1/116 |
| 2019/0056530 A1 | 2/2019 | Liu et al. |

* cited by examiner

OPTICAL ARTICLE COMPRISING AN ANTIREFLECTIVE COATING IN THE VISIBLE REGION FOR LOW LUMINANCE CONDITIONS

CROSS-REFERENCE TO RELATED APPLICATIONS

This application is a national phase application under 35 U.S.C. § 371 of International Application No. PCT/EP2015/055356 filed 13 Mar. 2015. The entire contents of the above-referenced disclosure is specifically incorporated by reference herein without disclaimer.

FIELD OF THE INVENTION

The present invention relates to an optical article especially an ophthalmic lens comprising an antireflective coating which strongly reduces reflection in the visible region and takes into account the specificity of scotopic vision for the human visual system. The optical article may be especially spectacle lens.

DESCRIPTION OF RELATED ART

Currently in the ophthalmic industry, anti-reflective coatings are widely used for minimizing the reflection from lenses in order to improve wearer's comfort as well as aesthetics. Generally, the key objective of antireflection design is to reach a reflectance as low as possible, while taking into account different constraints, e.g., manufacturing process, color robustness and number of layers, etc. An antireflection coating usually consists of multilayers comprising interferential thin layers, generally an alternation of layers based on a dielectric material of high refractive index and a dielectric material of low refractive index. When deposited on a transparent substrate, the function of such a coating is to reduce its light reflection and therefore to increase its light transmission. A substrate thus coated will therefore have its transmitted light/reflected light ratio increased, thereby improving the visibility of objects placed behind it. In addition, undesirable reflection (ghosts, glare) will be limited, especially for light coming from behind the wearer of ophthalmic lenses.

When it is sought to achieve a maximum antireflection effect, it is then preferable to provide both faces (front and rear faces) of the substrate with this type of coating.

This antireflective coating is usually used in the ophthalmic field. Accordingly, traditional antireflective coatings are designed and optimized to reduce reflection on the lens surface in the visible region, typically within the spectrum range of from 380 to 780 nm.

In general, a traditional spectacle lens comprises on one of its two faces, an antireflective coating having a low reflectivity in the visible region, such as the mean light reflection factor in the visible region $R_v$ is lower than 2.5%, often lower than 1%. This antireflective coating has also a nice cosmetic appearance, i.e: the residual reflected light has a pleasant dominant color (typically color of said residual reflected light is green or blue). As reflectance is a function of wavelength, and because the human eye has different sensitivity for various wavelengths, the mean light reflection $R_v$ of anti-reflective design is described by following equation:

$$Rv = \frac{\int_{380}^{780} R(\lambda) \cdot V(\lambda) \cdot D_{65}(\lambda) \cdot d\lambda}{\int_{380}^{780} V(\lambda) \cdot D_{65}(\lambda) \cdot d\lambda}$$

where
  $R(\lambda)$ is the reflectance at wavelength of $\lambda$,
  $V(\lambda)$ is the spectral luminous efficiency function $V(\lambda)$ of eye in CIE 1931,
  $D_{65}(\lambda)$ is the daylight illuminant defined in standard CIE S005/E-1998.

However, it is known that when luminance level decreases, human vision system functions differently (E. Fred Schubert, *Detailed Information on LEDs*, CHAPTER 16: HUMAN EYE SENSITIVITY AND PHOTOMETRIC QUANTITIES). It is well demonstrated that in reduced luminance levels, scotopic vision is dominating.

Under such condition, the sensitivity of human eyes is different as compared to that under normal luminance levels, also known as photopic vision. Indeed, depending on the amplitude of illumination, the human eye is acting with different sensors, i.e: mainly with cones for day vision (high illuminations above 10 $cd/m^2$) in lower luminance conditions, rod cells become important. Moreover in night vision or scotopic vision, the human eye is working in greyscales only. The human eye is also more sensitive to glare in conditions with low illumination or in the situation of scotopic vision.

The spectral luminous efficiency function for scotopic vision is for instance well described in CIE in 1951 as $V'(\lambda)$.

Therefore, up to now, all the reflective coatings of ophthalmic lens have been optimized for a low reflectivity in the visible region during daytime (with $R_v$ lower than 2.5%, often lower than 1%). The measured degree of reflectivity of these reflective coatings depends indeed, as it is illustrated by the above equation, on the reference illuminant D65 and on the spectral luminous efficiency function $V(\lambda)$ defined in CIE 1931. However, these parameters are not accurate for scotopic vision. It is worth noting that for scotopic vision in which light is rare, lowering reflectance is of primary importance.

Currently, so as to improve the scotopic visions or the night vision of ophthalmic lenses, it is known in the state of the art, and especially from the document WO2007/147509, to provide a transparent optical article having special absorption characteristics depending on wavelengths, i.e: absorption over 90% for wavelengths below 400 nm, absorption over 80% for wavelengths in the range between 400 to 420 nm and absorption below 20% for wavelengths above 470 nm.

The document WO 2008/059177 also describes an optical article able to absorb wavelengths in a specific region of the optical article (namely, peripheral vision) without lowering light transmission in another region of the optical article. Such an optical article provides some protection against glare but lowers light transmission.

Hence, the solutions developed in the state of the art to improve the scotopic vision by limiting glare are based on absorption, which overall lower light transmission and anti-reflective coatings are not used.

Therefore, there is still a need to provide novel anti-reflective coatings having very good anti-reflective properties in the visible region accurate for both photopic and scotopic visions versus the anti-reflective coatings of the prior art.

SUMMARY OF THE INVENTION

An object of the invention is therefore to remedy the above drawbacks, by seeking to develop a transparent ophthalmic lens, comprising a transparent substrate having at least an antireflective coating which is able to reduce reflectivity for both photopic and scotopic visions in the visible region, especially for scotopic vision.

The invention therefore relates to a transparent ophthalmic lens, comprising a transparent substrate with a front main face and with a rear main face, at least one of the main faces being coated with a multilayered antireflective coating comprising a stack of at least one high refractive index layer (HI) having a refractive index higher than or equal to 1.55 and at least one low refractive index layer (LI) having a refractive index lower than 1.55, characterized in that said multilayered antireflective coating has:
- a mean light reflection factor in the visible region for photopic vision Rv lower than or equal to 2.5%, preferably lower than or equal to 0.9%, for at least an angle of incidence lower than 35°;
- a mean light reflection factor in the visible region for scotopic vision Rv' lower than or equal to 0.5%, preferably lower than or equal to 0.4%, for at least an angle of incidence lower than 35°.

Within the meaning of the invention, the "mean light reflection factor for photopic vision" $R_v$ (and corresponding to the above mentioned equation), is such as defined in the ISO 13666:1998 Standard, and measured in accordance with the ISO 8980-4, i.e. this is the weighted spectral reflection average over the whole visible spectrum between 380 and 780 nm. $R_v$ is usually measured for an angle of incidence lower than 35°, typically of 30°, but can be evaluated for any angle of incidence.

According to the invention, "mean light reflection factor in the visible region for scotopic vision", noted Rv' is defined by the following equation:

$$Rv' = \frac{\int_{380}^{780} R(\lambda) \cdot V'(\lambda) \cdot Ilum(\lambda) \cdot d\lambda}{\int_{380}^{780} V'(\lambda) \cdot Ilum(\lambda) \cdot d\lambda}$$

where:
- $R(\lambda)$ is the reflectance at wavelength of $\lambda$,
- $Ilum(\lambda)$ is a reference illuminant
- $V'(\lambda)$ is the spectral luminous efficiency function of eye such as defined in CIE 1951 for scotopic vision, instead of using the spectral luminous efficiency function of eye $V(\lambda)$ in CIE 1931 as it is the case for the calculation of Rv for photopic vision.

Reference illuminant used here may be high luminance sources to be considered in glare reflection, like daylight spectrum represented by $D_{65}(\lambda)$ or the spectrum of artificial lighting encountered in driving conditions such as lamp bulbs or lighting LEDs; or low luminance sources like black-body spectrum defined according to the surface temperature of the source (moonlight for instance).

Indeed, as it is illustrated on FIG. 1, comparing $V(\lambda)$ in CIE 1931 and $V'(\lambda)$ in CIE 1951, the spectral luminous efficiency function $V(\lambda)$ has got a Gaussian shape with a peak value around 555 nm, whereas the spectral luminous efficiency function for scotopic vision has got also a Gaussian shape and shows clear blue shift with the peak value around 507 nm. Thus, the spectral luminous efficiency function of eye $V(\lambda)$ in CIE 1931 is not accurate for scotopic vision.

As used herein, the "angle of incidence" (symbol θ) is the angle formed by a ray light incident on an ophthalmic lens surface and a normal to the surface at the point of incidence. The ray light is, for instance, an illuminant light source. Generally the angle of incidence changes from 0° (normal incidence) to 90° (grazing incidence). The usual range for angle of incidence is from 0° to 75°.

BRIEF DESCRIPTION OF THE DRAWING

The present invention will be described in more detail by referring to the appended drawing, wherein.

DETAILED DESCRIPTION OF THE INVENTION AND PREFERRED EMBODIMENTS

Figure 1:
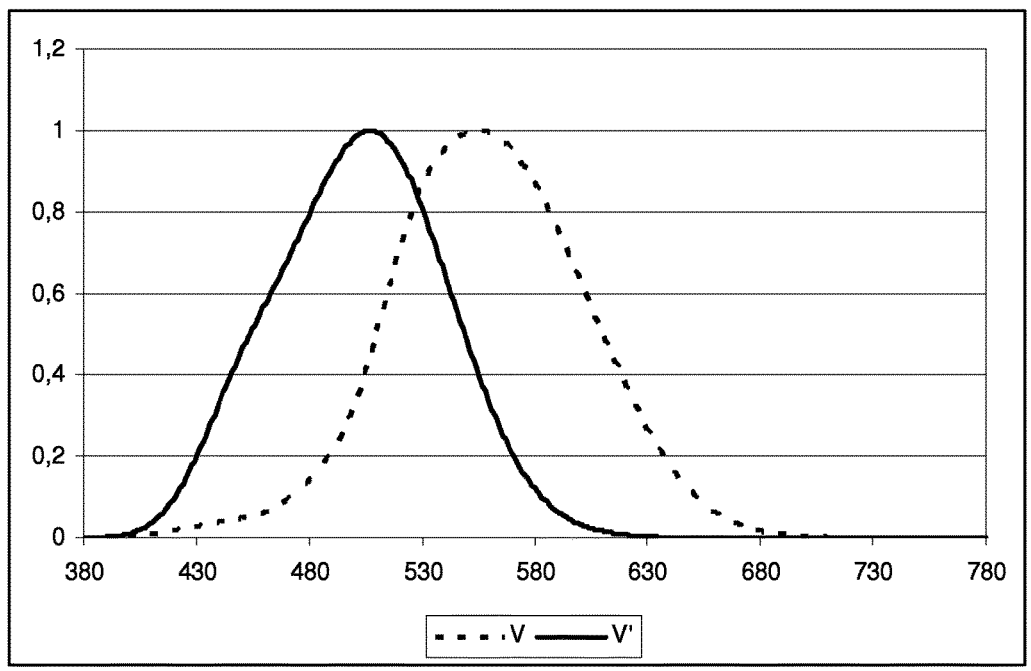
FIG. 1 shows the spectral luminous efficiency of eye for photopic vision normalized in CIE 1931 "$V(\lambda)$" and the spectral luminous efficiency of eye for scotopic visions normalized in CIE 1951 "$V'(\lambda)$" according to the wavelength in the visible region [380 nm-780 nm]

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof, such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises," "has," "contains," or "includes" one or more steps or elements possesses those one or more steps or elements, but is not limited to possessing only those one or more steps or elements.

Unless otherwise indicated, all numbers or expressions referring to quantities of ingredients, ranges, reaction conditions, etc. used herein are to be understood as modified in all instances by the term "about."

Also unless otherwise indicated, the indication of an interval of values <<from X to Y>> or "between X to Y", according to the present invention, means as including the values of X and Y.

The use of the word "a" or "an" when used in conjunction with the term "comprising" may mean "one," but it is also consistent with the meaning of "one or more," "at least one," and "one or more than one."

In the present application, when an optical article comprises one or more coatings onto the surface thereof, the expression "to deposit a layer or a coating onto the article" is intended to mean that a layer or a coating is deposited onto the external (exposed) surface of the outer coating of the article, that is to say its coating that is the most distant from the substrate.

A coating, that is said to be "on" a substrate or deposited "onto" a substrate is defined as a coating, which (i) is positioned above the substrate, (ii) is not necessarily in contact with the substrate, that is to say one or more intermediate coatings may be arranged between the substrate and the coating in question, and (iii) does not necessarily completely cover the substrate.

In a preferred embodiment, the coating on a substrate or deposited onto a substrate is in direct contact with this substrate.

When "a layer 1 is lying under a layer 2", it is intended to mean that layer 2 is more distant from the substrate than layer 1.

As used herein, the rear (or the inner) face of the substrate is intended to mean the face which, when using the article, is the nearest from the wearer's eye. It is generally a concave face. On the contrary, the front face of the substrate, is the face which, when using the article, is the most distant from the wearer's eye. It is generally a convex face.

The optical article prepared according to the present invention is a transparent optical article, preferably a lens or lens blank, and more preferably an ophthalmic lens or lens blank. The optical article may be coated on its convex main side (front side), concave main side (back side), or both sides using the process of the invention.

Generally speaking, the antireflective coating of the optical article according to the invention, which will be called the "the antireflective coating", may be deposited onto any substrate, and preferably onto organic lens substrates, for example a thermoplastic or thermosetting plastic material.

Thermoplastic may be selected from, for instance: polyamides; polyimide; polysulfones; polycarbonates and copolymers thereof; poly(ethylene terephtalate) and polymethylmethacrylate (PMMA).

Thermoset materials may be selected from, for instance: cycloolefin copolymers such as ethylene/norbornene or ethylene/cyclopentadiene copolymers; homo- and copolymers of allyl carbonates of linear or branched aliphatic or aromatic polyols, such as homopolymers of diethylene glycol bis(allyl carbonate); homo- and copolymers of (meth)acrylic acid and esters thereof, which may be derived from bisphenol A; polymer and copolymer of thio(meth)acrylic acid and esters thereof, polymer and copolymer of allyl esters which may be derived from Bisphenol A or phtalic acids and allyl aromatics such as styrene, polymer and copolymer of urethane and thiourethane, polymer and copolymer of epoxy, and polymer and copolymer of sulphide, disulfide and episulfide, and combinations thereof.

As used herein, a (co)polymer is intended to mean a copolymer or a polymer. As used herein, a (meth)acrylate is intended to mean an acrylate or a methacrylate. As used herein, a polycarbonate (PC) is intended to mean either homopolycarbonates or copolycarbonates and block copolycarbonates.

In particular, the antireflective coating is deposited on a substrate having a refractive index higher than or equal to 1.5. This kind of substrate may be made for instance of diethylene glycol bis(allyl carbonate) (CR39®).

In other embodiments, the antireflective coating is deposited on a substrate having a refractive index higher than or equal to 1.59. This kind of substrate may be made for instance of polycarbonates, polythio(meth)acrylates, polythiourethanes, (polyepoxides, polyepisulfides), or copolymers thereof and blends thereof.

As previously mentioned, the ophthalmic lens according to the invention, comprises a transparent substrate with a front main face and with a rear main face, at least one of the main faces being coated with a multilayered antireflective coating comprising a stack of at least one high refractive index layer (HI) having a refractive index higher than or equal to 1.55 and at least one low refractive index layer (LI) having a refractive index lower than 1.55, characterized in that said multilayered antireflective coating has:
- a mean light reflection factor in the visible region for photopic vision Rv lower than or equal to 2.5%, preferably lower than or equal to 0.9%, for at least an angle of incidence lower than 35°;
- a mean light reflection factor in the visible region for scotopic vision Rv' lower than or equal to 0.5%, preferably lower than or equal to 0.4%, typically lower than or equal to 0.3%, for at least an angle of incidence lower than 35°.

The Applicant has indeed discovered that the new antireflective design of the invention is able to give greater consideration to shorter wavelengths, which will reduce the perceived reflection under the low luminance conditions of scotopic vision. In turn, overall transmittance of the lens could be increased, which is particularly important for night vision. In addition, the antireflective coating design of the invention enables to avoid glare in conditions with low illuminations, i.e: in the situation of scotopic vision.

In fact, as it will be shown in the example described below, the mean light reflection factor for scotopic vision Rv' and the mean light reflection factor in the visible region Rv have been improved with the anti-reflective design of the invention as compared with a classical anti-reflective stack according to the prior art.

In addition, said multilayered antireflective coating has, preferably, a mean reflection factor $R_{UV}$, weighted by the $W(\lambda)$ function defined according to the ISO 13666:1998 Standard, between 280 nm and 380 nm, lower than 5% for an angle of incidence in the range from 20° to 50°.

In the present application, the mean reflection factor $R_{UV}$ between 280 nm and 380 nm, weighted by the $W(\lambda)$ function defined according to the ISO 13666:1998 Standard may be defined through the following relation:

$$R_{UV} = \frac{\int_{280}^{380} W(\lambda).R(\lambda).d\lambda}{\int_{280}^{380} W(\lambda).d\lambda}$$

wherein $R(\lambda)$ represents the lens spectral reflection factor at a given wavelength, and $W(\lambda)$ represents a weighting function equal to the product of the solar spectrum irradiance $Es(\lambda)$ and the efficiency relative spectral function $S(\lambda)$.

The spectral function $W(\lambda)$, enabling to calculate the ultraviolet radiation transmission and/or reflection factors, is defined according to the ISO 13666:1998 Standard. It makes it possible to express the ultraviolet solar radiation distribution tempered by the relative spectral efficiency of such radiation for the wearer, since it simultaneously takes both the solar spectral energy $Es(\lambda)$ into account, which does globally emit less UVB-rays as compared to UVA-rays, and the spectral efficiency $S(\lambda)$, UVB-rays being more harmful than UVA-rays.

As mentioned above, the multilayered anti-reflective coating deposited on the substrate comprises a stack of at least one high refractive index layer (HI) and at least one low refractive index layer (LI).

More preferably, it comprises at least two layers with a low refractive index (LI) and at least two layers with a high refractive index (HI). It is here a simple stack, since the layer total number in the anti-reflective coating is higher than or equal to 3, preferably higher than or equal to 4, and lower than or equal to 7, more preferably lower than or equal to 6, even more preferably lower than or equal to 5, and most preferably equal to 5 or 6 layers.

As used herein, a layer of the anti-reflective coating is defined as having a thickness higher than or equal to 1 nm. Thus, any layer having a thickness lower than 1 nm will not be considered when counting the number of layers in the anti-reflective coating.

Unless stated otherwise, all thicknesses disclosed in the present application relate to physical thicknesses.

HI layers and LI layers do not need to alternate with each other in the stack, although they also may, according to one above described embodiment of the invention. Two HI layers (or more) may be deposited onto each other, as well as two LI layers (or more) may be deposited onto each other.

However, generally, the layer which is the nearest of the substrate is a HI layer.

Especially, a high refractive index sheet (HI) is located between said substrate and the first low refractive index layer (LI) in the direction moving away from said substrate and comprises at least as material(s), $SiO_x$ with x<2, $TiO2$ or $SiO_x + TiO_2$ (i.e: a sheet comprising two layers: a layer based of $SiO_x$ which is adjacent to a layer based of $TiO_2$).

According to an embodiment of the invention, said high refractive index sheet located between said substrate and said first low refractive index layer (LI) in the direction moving away from said substrate is a bilayer and comprises:
  a layer L1 of $SiO_x$ with x<2 having a thickness of about 5 to 15 nm, which is in direct contact with the substrate,
  a layer L2 of $TiO_2$ having a thickness of about 5 to 15 nm, which is in direct contact with L1 layer.

Preferably, L1 and L2 have a physical thickness lower than or equal to 10 nm and in particular a physical thickness strictly lower than 10 nm.

According to another embodiment of the invention, said high refractive index sheet located between said substrate and said first low refractive index layer, in the direction moving away from said substrate, is a layer of $TiO_2$ having a thickness of about 8 to 20 nm, which is in direct contact with the substrate.

In the present application, a layer of the anti-reflective coating is said to be a layer with a high refractive index (HI) when its refractive index is higher than or equal to 1.55, preferably higher than or equal to 1.6, even more preferably higher than or equal to 1.7, even more preferably higher than or equal to 1.8 and most preferably higher than or equal to 1.9. A layer of an anti-reflective coating is said to be a low refractive index layer (LI) when its refractive index is lower than 1.55, preferably lower than or equal to 1.50, more preferably lower than or equal to 1.48 and most preferably lower than or equal to 1.47.

Unless otherwise specified, the refractive indexes referred to in the present application are expressed at 25° C. at a wavelength of 530 nm.

The HI layer is a traditional high refractive index layer that is well known in the art. It generally comprises one or more metal oxides such as, without limitation, zirconia ($ZrO_2$), titanium dioxide ($TiO_2$), alumina ($Al_2O_3$), silicon nitride ($Si_3N_4$), tantalum pentoxide ($Ta_2O_5$), neodymium oxide ($Nd_2O_5$), praseodymium oxide ($Pr_2O_3$), praseodymium titanate ($PrTiO_3$), lanthanum oxide ($La_2O_3$), niobium oxide ($Nb_2O_5$), yttrium oxide ($Y_2O_3$), silicon oxide ($SiO_x$) with x<2.

Thus, the HI layers may further contain silica or other materials with a low refractive index, provided they have a refractive index higher than or equal to 1.55 as indicated here above. The preferred materials include $TiO_2$, $PrTiO_3$, $ZrO_2$, $Al_2O_3$, $Si_3N_4$, $Y_2O_3$, silicon oxide ($SiO_x$) with x<2 and mixtures thereof.

In particular, the metal oxides are selected from zirconia ($ZrO_2$), titanium dioxide ($TiO_2$) or silicon oxide ($SiO_x$) with x<2.

The LI layer is also well known and may comprise, without limitation, MgF2 or one or more metal oxides selected from: silica ($SiO_2$); or a mixture of silica and alumina, the latter contributing to increase the anti-reflective coating thermal resistance. The low refractive index layer (LI) is preferably a layer comprising at least 80% by weight of silica, more preferably at least 90% by weight of silica, relative to the layer total weight, and even more preferably consists in a silica $SiO_2$ layer.

Optionally, the LI layers may further contain materials with a high refractive index, provided the refractive index of the resulting layer is lower than 1.55.

In one embodiment of the present invention, the anti-reflective coating outer layer, which corresponds to layer which is the farthest from the substrate, is a low refractive index layer. In particular, this outer layer is a silica-based layer, comprising preferably at least 80% by weight of silica, more preferably at least 90% by weight of silica (for example a silica layer doped with alumina), relative to the layer total weight, and even more preferably consists in a silica layer.

Especially, the outer layer is a monolayer and has a thickness at most 100 nm, preferably between 40 to 88 nm and in particular from 60 to 83 nm.

The optical article of the invention may be made anti-static, that is to say not to retain and/or develop a substantial static charge, by incorporating at least one charge dissipating conductive layer into the stack present on the surface of the article.

The charge dissipating conductive layer should be thin enough not to alter the transparency of the anti-reflective coating. The electrically conductive layer is preferably made from an electrically conductive and highly transparent material, generally an optionally doped metal oxide. In this case, the thickness thereof preferably varies from 1 to 15 nm, more preferably from 1 to 10 nm.

Preferably, the electrically conductive layer comprises an optionally doped metal oxide, selected from indium, tin, zinc oxides and mixtures thereof. Tin-indium oxide (In2O3: Sn, tin-doped indium oxide), aluminum-doped zinc oxide (ZnO:Al), indium oxide (In2O3) and tin oxide (SnO2) are preferred. In a particular embodiment, the electrically conductive and optically transparent layer is an indium-tin oxide layer, noted ITO layer or a tin oxide layer. Typically, ITO layer is composed of about 10% in weight of tin oxide and about 90% in weight of indium oxide.

According to an embodiment, the multilayered anti-reflective coating according to the invention may comprise in the direction moving away from the substrate,
  said high refractive index sheet as defined above;
  one low refractive index layer (LI) having a physical thickness of from 16 to 36 nm;
  one high refractive index layer (HI) having a physical thickness of from 80 to 120 nm;
  optionally an electrically conductive layer with a thickness of from 3 to 10 nm; and
  one low refractive index layer (LI) having a physical thickness of from 68 to 88 nm.

In another embodiment, the multilayered antireflective coating of the invention may comprise, in the direction moving away from the substrate, said high refractive index sheet as defined above;
one low refractive index layer (LI) having a physical thickness of from 21 to 31 nm;
one high refractive index layer (HI) having a physical thickness of from 85 to 110 nm;
optionally an electrically conductive layer with a thickness of from 3 to 10 nm; and
one low refractive index layer (LI) having a physical thickness of from 73 to 83 nm.

The various layers of the anti-reflective coating are preferably deposited by vapor deposition, under vacuum, according to any of the following methods: i) by optionally ion-beam assisted, evaporation; ii) by ion-beam sputtering; iii) by cathode sputtering; iv) by plasma-assisted vapor deposition; v) by magnetron sputtering; vi) by electron beam assisted evaporation; vii) by thermal evaporation. These various methods are described in the following references "Thin Film Processes" and "Thin Film Processes II," Vossen & Kern, Ed., Academic Press, 1978 and 1991, respectively. A particularly recommended method is thermal or electron beam assisted evaporation under vacuum.

Prior to depositing the antireflective coating onto the substrate, the latter may be submitted to a physical or chemical surface activating treatment, so as to reinforce the adhesion of the antireflective coating. Such pre-treatment is generally conducted under vacuum. It may be a bombardment with energetic and/or reactive species, for example with an ion beam ("Ion Pre-Cleaning" or "IPC") or with an electron beam, a corona discharge treatment, an ion spallation treatment, an ultraviolet treatment or a plasma-mediated treatment under vacuum, generally using an oxygen or an argon plasma. It may also be an acid or basic treatment and/or a solvent-based treatment (water, hydrogen peroxide or any organic solvent).

The present invention provides hence an ophthalmic article having an anti-reflective coating with an improved conception, comprising a stack made of thin layers, the thicknesses and materials of which have been selected so as to obtain satisfactory anti-reflective performances in the visible region under scotopic and photopic conditions.

In addition, the multilayered antireflective coating of the ophthalmic lens of the invention has also aesthetic appearance.

Indeed, residual reflected light from said multilayered antireflective coating has a Chroma C*, as defined in the colorimetric CIE L*a*b* and for an angle of incidence (θ) of 30° equal or lower than 15, preferably lower or equal to 12.

Besides, residual reflected light from has a hue (h), as defined in the colorimetric CIE L*a*b*, between 20° and 60° (orange color) for an angle of incidence (θ) of 30°.

Another aesthetic aspect of the invention is Yellowness Index (YI). If YI of light transmitted through the ophthalmic lens is low, colour perception will be very pleasant for the wearer. Otherwise, colours will appear somehow modified.

The present invention provides ophthalmic lenses with Yellowness Index of transmitted light, measured with the international colorimetric system CIE (observer angle 10°) lower or equal to 6, preferably lower or equal to 3, more preferably lower than or equal to 2.

Preferably, the rear main face and the front main face of the ophthalmic lens are coated with similar or different said multilayered antireflective coating according to the invention. The multilayered anti-reflective coatings of the front face and of the rear face may be indeed the same or different.

For instance, it is possible for the rear face of the optical article to be coated with an anti-reflective coating that is more efficient in scotopic and/or photopic conditions than that of the substrate's front face (according to the characteristics described above).

The anti-reflective coating may be deposited directly onto a bare substrate. In some applications, it is preferred for the main face of the substrate to be coated with one or more functional coatings prior to depositing the anti-reflective coating of the invention. These functional coatings traditionally used in optics may be, without limitation, an impact-resistant primer layer, an abrasion-resistant coating and/or a scratch-resistant coating, a polarizing coating, a photochromic coating, a tinted coating or a sub-layer.

Generally, the front and/or rear main face of the substrate onto which an antireflective coating will be deposited is coated with an impact-resistant primer layer, with an anti-abrasion and/or anti-scratch coating, or with an impact-resistant primer layer coated with an anti-abrasion and/or anti-scratch coating.

The anti-UV, antireflective coating of the invention is preferably deposited onto an anti-abrasion and/or anti-scratch coating. The anti-abrasion and/or scratch-resistant coating may be any layer traditionally used as an anti-abrasion and/or anti-scratch coating in the field of ophthalmic lenses.

Prior to depositing the abrasion-resistant coating and/or the scratch-resistant coating, it is possible to apply onto the substrate a primer coating to improve the impact resistance and/or the adhesion of the subsequent layers in the final product. This coating may be any impact-resistant primer layer traditionally used for articles in a transparent polymer material, such as ophthalmic lenses.

In one embodiment of the present invention, the anti-reflective coating is deposited onto a sub-layer. It should be noted that such anti-reflective coating sub-layer does not belong to the anti-reflective coating.

As used herein, an anti-reflective coating sub-layer or adhesion layer is intended to mean a relatively thick coating, used in order to improve the mechanical properties such as the abrasion resistance and/or the scratch resistance of said coating and/or so as to reinforce its adhesion to the substrate or to the underlying coating.

The optical article according to the invention may also comprise coatings formed on the antireflective coating and capable of modifying the surface properties thereof, such as hydrophobic, oleophobic, and/or hydrophilic coatings (antifouling, antifog, antirain, antistain top coat). These coatings are preferably deposited onto the outer layer of the antireflective coating.

Typically, an ophthalmic lens according to the invention comprises a substrate that is successively coated on its rear face with an anti-abrasion and scratch-resistant layer, an antireflective coating according to the invention, and with a hydrophobic, oleophobic, and/or hydrophilic coating. The ophthalmic lens according to the invention is preferably an ophthalmic lens for spectacles (spectacle lens), or a blank for ophthalmic lenses.

The front face of the substrate of the optical article may be successively coated with an abrasion-resistant layer and/or a scratch-resistant layer, an antireflective coating which may be, or not, an antireflective coating according to the invention, and with a hydrophobic, oleophobic, and/or hydrophilic coating.

In one embodiment, the optical article according to the invention does not absorb in the visible or not much, which means, in the context of the present application, that its transmission factor in the visible range $\tau_v$, also called relative transmission factor in the visible range, is higher than 90%, more preferably higher than 95%, even more preferably higher than 96% and most preferably higher than 97%.

The factor $\tau_v$ should be understood as defined by the international normalized definition (ISO 13666:1998 Standard) and is measured in accordance with the ISO 8980-3 Standard. It is defined in the wavelength range of from 380 to 780 nm.

Preferably, the light absorption of the article coated according to the invention is lower than or equal to 1%.

The following examples illustrate the present invention in a more detailed, but non-limiting manner.

EXAMPLES

1. General Procedures

Optical articles according to the invention were designed with the target of achieving the minimum Rv', produced, and tested.

The optical articles used in the example according to the invention comprise a lens substrate having a 65 mm diameter, a refractive index of 1.50 (made of CR39®), 1.60 (made of MR8®) or 1.67 (made of MR7®), and a power of −2.00 diopters, coated with a hard coat layer whose refractive index is matched with the underlying substrate and coated on its front face with the anti reflection coating of the invention (see TABLE 1). For lenses 1 to 3, the HI sheet which is the closest form the substrate is a bilayer made of a first layer L1 of SiO and a second layer of $TiO_2$. For lens 4, the HI sheet which is the closest form the substrate is single layer of $TiO_2$.

As comparative purpose, another optical article is prepared with an antireflective coating according to the prior art. This comparative lens comprises a lens substrate having a 65 mm diameter, a refractive index of 1.50 (made of CR39®), and a power of −2.00 diopters, coated with a hard coat layer whose refractive index is matched with the underlying substrate and coated on its front face with an anti reflection coating of the prior art (see TABLE 1). The HI sheet which is the closest form the substrate is single layer of $ZrO_2$. This lens is named hereafter "Comp.Lens".

The deposition frame is a Leybold 1104 machine fitted with an electron gun for evaporating oxides, and provided with an ion gun (Mark II) for the preliminary phase to prepare the surface of the substrate using argon or oxygen ions (IPC).

The thickness of the layers was controlled by means of a quartz microbalance. The spectral measurements were effected on Cary6 from Agilent technologies.

2. Test Procedure

The method for making optical articles "Lens 1 to 4" and "Comp.Lens" comprises the step of introducing the hard coated substrate in the deposition machine, a step of activating the surface of the substrate by means of an ion beam, turning the ion irradiation off, then subsequently depositing the various layers of the anti-reflective coating by successive evaporations and at last a ventilation step.

3. Results

Figure 2:
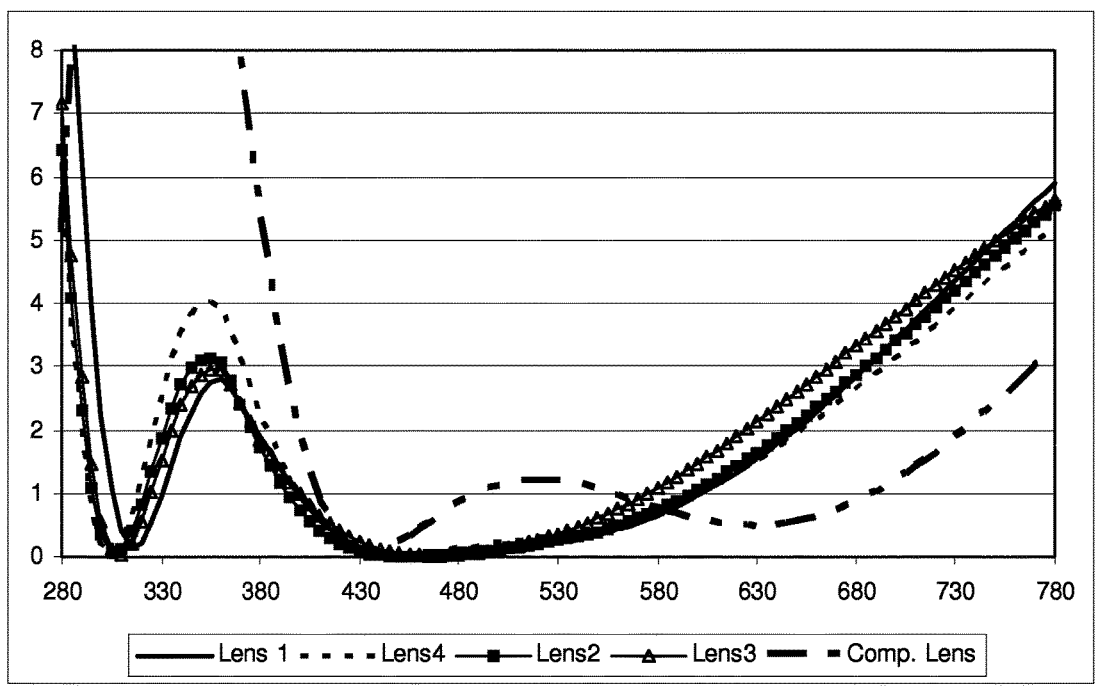
FIG. 2 shows the variation of the reflection (R, %) on the front face surface of several lenses prepared in example of the present application and of a lens according to the prior art according to the wavelength in the UV-visible region [280 nm-780 nm].

The structural characteristics and the optical performances of "Lens 1 to 4" and "Comp.Lens" obtained are detailed hereunder. The reflection graphs between 280 and 780 nm of some articles prepared are illustrated on FIG. 2.

The reflection mean factor values are those of the front face. The factors $R_v$ and $R_{v'}$ are provided for an angle of incidence ( ) of 30° and the colorimetric coefficients of the optical article of the invention in the international colorimetric system CIE L*,a*,b*, Chroma (C*), and hue (h*) are calculated between 380 and 780 nm, taking the standard illuminant D65 at angle of incidence 30° and the observer into account (angle of 10°) (for all the examples). Yellowness Index of transmitted light (observer angle 10°) is also reported (see TABLE 2).

TABLE 2

|  | Lens1 | Lens2 | Lens3 | Lens4 | Comp. lens |
|---|---|---|---|---|---|
| L* | 4.94 | 7.39 | 8.23 | 6.45 | 7.96 |
| C* | 12.7 | 11.8 | 12.3 | 10.8 | 11.48 |
| h° | 36 | 50 | 53 | 36 | 145 |
| Yellowness Index | 1.15 | 0.73 | 2.08 | 2.01 | 1.21 |
| Rv' (scotopic) | 0.17 | 0.44 | 0.50 | 0.41 | 0.93 |
| Rv (photopic) | 0.58 | 0.86 | 0.95 | 0.74 | 0.89 |
| Ruv | 1.18 | 2.4 | 2.42 | 3.96 | 15.07 |

The lenses 1 to 4 according to the example above possesses very good anti-reflective properties in the visible

TABLE 1

|  | Layer | Refractive Index | Lens1 | Lens2 | Lens3 | Lens4 | Layer | Comp. lens |
|---|---|---|---|---|---|---|---|---|
| Medium | Air | 1 |  |  |  |  | Air |  |
| 1 | SiO2 | 1.47467 | 77.79 | 78.9 | 78.9 | 78.91 | SiO2 | 86.66 |
| 2 | ITO | 2.14052 | 7.07 | 6.8 | 6.8 | 6.8 | ITO | — |
| 3 | ZrO2 | 2.02727 | 92.19 | 90.9 | 90.9 | 90.85 | ZrO2 | 82.65 |
| 4 | SiO2 | 1.47467 | 34.27 | 26 | 26 | 26.01 | SiO2 | 18.96 |
| 5 | TiO2 | 2.204 | 7.83 | 9.9 | 9.9 | 11.51 | ZrO2 | 32.14 |
| 6 | SiO | 1.70931 | 9.47 | 9.1 | 9.1 | — | SiO | — |
| Hard Coated Substrate |  |  | 1.50 (CR-39 ®) | 1.60 (MR8 ®) | 1.67 (MR7 ®) | 1.60 (MR8 ®) |  | 1.50 (CR-39 ®) |

The ITO (tin doped indium oxide) layer is composed of 90% of indium oxide.

The layers of the anti-reflective coating were deposited with heating the substrates by evaporation under vacuum (evaporation source: electron gun).

region for both photopic and scotopic visions, as compared to the antireflective of the prior art. Indeed, Rv and Rv' of lens 1 to 4, according to the invention, are lower than the ones of the comparative lens. Particularly, Rv' of the anti-reflective according to the invention is extremely low, lower than about 0.5% with a minimum value for Lens 1 of 0.17%;

as shown in Table 2, which is very promising for night vision and night activity applications.

The invention claimed is:

1. An ophthalmic lens comprising a transparent substrate with a front main face and with a rear main face, at least one of the main faces being coated with a multilayered antireflective coating comprising a stack of at least one high refractive index layer (HI) having a refractive index higher than or equal to 1.55 and at least one low refractive index layer (LI) having a refractive index lower than 1.55, wherein said multilayered antireflective coating has:
 a mean light reflection factor in the visible region for photopic vision Rv lower than or equal to 2.5%, for at least an angle of incidence lower than 35°; and
 a mean light reflection factor in the visible region for scotopic vision Rv' lower than or equal to 0.5%, for at least an angle of incidence lower than 35°.

2. The ophthalmic lens according to claim 1, wherein a high refractive index sheet is located between said substrate and a first low refractive index layer in a direction moving away from said substrate, said high refractive index sheet comprising $SiO_x$ with $0<x<2$, $TiO_2$, or two layers composed of a first layer based of $SiO_x$ which is adjacent to a second layer based of $TiO_2$, wherein said high refractive index sheet is the nearest from the substrate among said LI layer, said HI layer, or said HI sheet composing the AR coating.

3. The ophthalmic lens according to claim 2 wherein said high refractive index sheet located between said substrate and said first low refractive index layer in the direction moving away from said substrate is a bilayer and comprises
 a layer L1 of $SiO_x$ with $0<x<2$ having a thickness of about 5 to 15nm, in direct contact with the substrate,
 a layer L2 of $TiO_2$ having a thickness of about 5 to 15nm, in direct contact with the L1 layer defined above.

4. The ophthalmic lens according to claim 3, wherein L1 and L2 have a physical thickness lower than or equal to 10 nm.

5. The ophthalmic lens according to claim 2 wherein said high refractive index sheet located between said substrate and said first low refractive index layer in the direction moving away from said substrate is a layer of $TiO_2$ having a thickness of about 8 to 20 nm, in direct contact with the substrate.

6. The ophthalmic lens according to claim 2, wherein said multilayered antireflective coating comprises, in the direction moving away from the substrate,
 said high refractive index sheet located between substrate and said first low refractive index layer in the direction moving away from said substrate comprises, $SiO_x$ with $0<x<2$ and/or $TiO_2$;
 one low refractive index layer (LI) having a physical thickness of from 16 to 36 nm;
 one high refractive index layer (HI) having a physical thickness of from 80 to 120 nm;
 an electrically conductive layer with a thickness of from 3 to 10 nm; and
 one low refractive index layer (LI) having a physical thickness of from 68 to 88 nm.

7. The ophthalmic lens according to claim 6, wherein said multilayered antireflective coating comprises, in the direction moving away from the substrate,
 said high refractive index sheet;
 said one low refractive index layer (LI) having a physical thickness of from 21 to 31 nm;
 said one high refractive index layer (HI) having a physical thickness of from 85 to 110 nm;
 said electrically conductive layer with a thickness of from 3 to 10 nm; and
 said one low refractive index layer (LI) having a physical thickness of from 73 to 83 nm.

8. The ophthalmic lens according to claim 6, wherein the high refractive index layer (HI) comprises one or more metal oxides selected from: zirconia ($ZrO_2$), titanium dioxide ($TiO_2$), alumina ($Al_2O_3$), tantalum pentoxide ($Ta_2O_5$), neodymium oxide ($Nd_2O_5$), praseodymium oxide ($Pr_2O_3$), praseodymium titanate ($PrTiO_3$), lanthanum oxide ($La_2O_3$), niobium oxide ($Nb_2O_5$), yttrium oxide ($Y_2O_3$), silica (SiOx), silicon nitrides ($Si_3N_4$).

9. The ophthalmic lens according to claim 8, wherein said high refractive index layer (HI) comprises one or more metal oxides selected from zirconia ($ZrO_2$) or titanium dioxide ($TiO_2$).

10. The ophthalmic lens according to claim 6, wherein the low refractive index layer (LI) comprises $MgF_2$ or one or more metal oxides selected from: $SiO_2$, or a mixture of silica and alumina.

11. The ophthalmic lens according to claim 10, wherein the low refractive index layer (LI) consists of silica $SiO_2$.

12. The ophthalmic lens according to claim 6, wherein said electrically conductive layer comprises indium oxide, tin dioxide, zinc oxides or mixtures thereof.

13. The ophthalmic lens according to claim 12, wherein said electrically conductive layer comprises Indium Tin Oxide $In_2O_3/SnO_2$.

14. The ophthalmic lens according to claim 1, wherein the substrate is made of polycarbonates, polythio(meth)acrylates, polythiourethanes, (polyepoxides, polyepisulfides), or copolymers thereof and blends thereof.

15. The ophthalmic lens according to claim 1, wherein said multilayered antireflective coating has a mean reflection factor $R_{uv}$ between 280 nm and 380 nm, lower than 5% for an angle of incidence in the range from 20° to 50°.

16. The ophthalmic lens according to claim 1, wherein residual reflected light from said multilayered antireflective coating has a Chroma C*, as defined in the colorimetric CIE L*a*b* and for an angle of incidence (θ) of 30° equal or lower than 15.

17. The ophthalmic lens according to claim 1, wherein residual reflected light from said multilayered antireflective coating has a hue (h) as defined in the colorimetric CIE L*a*b* between 20° and 60°, for an angle of incidence (θ) of 30°.

18. The ophthalmic lens according to claim 1, wherein the rear main face and the front main face of the ophthalmic lens are coated with similar or different said multilayered antireflective coating.

19. The ophthalmic lens according to claim 1, wherein a high refractive index sheet is in direct contact with said substrate and is located between said substrate and said first low refractive index layer in the direction moving away from said substrate, said high refractive index sheet comprising $SiO_x$ with $0<x<2$, $TiO_2$, or two layers composed of a first layer based of $SiO_x$ which is adjacent to a second layer based of $TiO_2$, wherein said high refractive index sheet is the nearest from the substrate among said LI layer, said HI layer, or said HI sheet composing the AR coating.

20. The ophthalmic lens according to claim 2, wherein said multi-layered antireflective coating comprises, in the direction moving away from the substrate,
 said high refractive index sheet located between said substrate and said first low refractive index layer in the direction moving away from said substrate comprises $SiO_x$ with $0<x<2$ and/or $TiO_2$;

one low refractive index layer (LI) having a physical thickness of from 16 to 36 nm;
one high refractive index layer (HI) having a physical thickness of from 80 to 120 nm; and
one low refractive index layer (LI) having a physical thickness of from 68 to 88 nm.

\* \* \* \* \*

UNITED STATES PATENT AND TRADEMARK OFFICE
CERTIFICATE OF CORRECTION

PATENT NO.         : 10,481,413 B2
APPLICATION NO.    : 15/557665
DATED              : November 19, 2019
INVENTOR(S)        : Conrad Höfener and Thorsten Stein It is certified that error appears in the above-identified patent and that said Letters Patent is hereby corrected as shown below:

In the Claims

Claim 6, Column 13, Line 51:
Delete "$TiO_2$" and replace with -- $TiO_2$ --.

Signed and Sealed this
Thirty-first Day of March, 2020

Andrei Iancu
*Director of the United States Patent and Trademark Office*